United States Patent [19]

Nishida et al.

[11] Patent Number: 4,974,680
[45] Date of Patent: Dec. 4, 1990

[54] SHEET-FEEDING MECHANISM

[75] Inventors: Hideaki Nishida; Chihiro Kosaka; Takeshi Hiyoshi; Tadashi Sugiyama, all of Shizuoka, Japan

[73] Assignee: Tokyo Electric Co., Ltd., Tokyo, Japan

[21] Appl. No.: 432,052

[22] Filed: Nov. 6, 1989

[30] Foreign Application Priority Data

Nov. 14, 1988 [JP] Japan ................................ 63-287158
Feb. 10, 1989 [JP] Japan .................................. 1-32291

[51] Int. Cl.$^5$ ........................ B65H 3/06; B65H 5/04
[52] U.S. Cl. .................................... 271/274; 271/109
[58] Field of Search ................. 271/109, 117, 272–274

[56] References Cited

U.S. PATENT DOCUMENTS

| 3,622,059 | 11/1971 | Savela | 271/272 |
| 3,734,491 | 5/1973 | Beery et al. | 271/274 |
| 4,387,889 | 6/1983 | Koyama et al. | |
| 4,893,806 | 1/1990 | McLaughlin | 271/272 |

FOREIGN PATENT DOCUMENTS

| 3035117 | 4/1981 | Fed. Rep. of Germany . | |
| 3437553 | 4/1985 | Fed. Rep. of Germany . | |
| 2059013 | 4/1981 | United Kingdom . | |
| 56-23796 | 6/1981 | Japan . | |
| 59-25788 | 7/1984 | Japan . | |
| 229745 | 10/1986 | Japan | 271/272 |
| 62-10271 | 3/1987 | Japan . | |
| 252845 | 10/1988 | Japan | 271/109 |
| 63-287158 | 11/1988 | Japan . | |
| 1-32291 | 2/1989 | Japan . | |

OTHER PUBLICATIONS

Richards, et al., "Composite Drive Roll", *IBM Technical Disclosure Bulletin*, vol. 19, No. 1, p. 248, Jun. 1976.
Kraniauskas, et al., "Resilient Roller", *Xerox Discosure Journal*, vol. 4, No. 1, p. 9, Jan./Feb. 1979.

*Primary Examiner*—Joseph J. Rolla
*Assistant Examiner*—Steven Reiss
*Attorney, Agent, or Firm*—Frishauf, Holtz, Goodman & Woodward

[57] ABSTRACT

A sheet-feeding mechanism comprises feed rollers attached to a first driving shaft and spaced from each other by a predetermined distance, two of the feed rollers being end feed rollers located at both ends of the first driving shaft. A pair of end ball rollers are attached to a second driving shaft and located in correspondence to the end feed rollers. A double-structure bail roller is attached to the second driving shaft in correspondance to the feed rollers, except for the end feed rollers. The double-structure bail roller includes an inner core and an outer layer having a small friction coefficient. The iner core is elastically deformable in a direction in which the end feed rollers are pressed against the corresponding bail rollers.

4 Claims, 6 Drawing Sheets

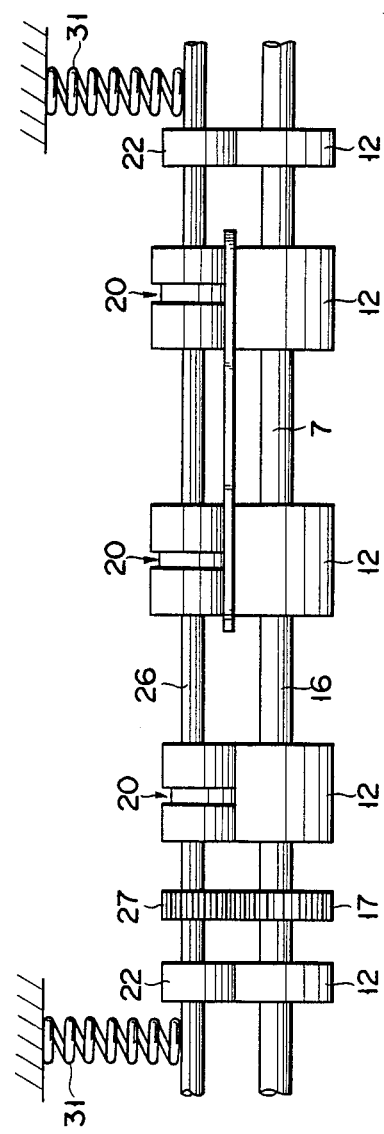

SHEET-FEEDING MECHANISM

BACKGROUND OF THE INVENTION

1. Field of the Invention

The present invention relates to a sheet-feeding mechanism employed in a printer, or the like and transferring sheet between rollers.

2. Description of the Related Art

A conventional sheet-feeding mechanism comprises a pressing member of predetermined weight which presses upper rollers carried by a shaft, so as to prevent the shaft from curving despite the thickness of a sheet to be fed. Such a pressing member is disclosed in e.g., Published Examined Japanese Utility Model Application (PEJUMA) No. 59-25788. However, it is likely that the pressing member will increase the friction between the sheet and rollers more than necessary. If the friction between the two is too large, the print side of the sheet may be stained when ink is transferred onto it. In addition, if the pressure applied to the shaft is not uniform, the sheet may not be fed in a stable manner.

The sheet-feeding mechanism disclosed in Published Examined Japanese Patent Application (PEJPA) No. 56-23796 employs deformable rollers formed of an elastic material. Since such rollers prevent a shaft from curving, they enable a sheet to be fed with high accuracy. In general, however, deformable or elastic rollers have a large friction coefficient, so that the problem that the print side of a sheet is stained with ink remains unsolved.

SUMMARY OF THE INVENTION

Accordingly, an object of the present invention is to provide a sheet-feeding mechanism, which is of a simple structure and permits a sheet to be fed with high accuracy by preventing a shaft from curving despite the thickness of the sheet, and which does not stain the sheet when ink is transferred onto it.

BRIEF DESCRIPTION OF THE INVENTION

FIG. 8 is a front view of the entire sheet-feeding mechanism according to an alternative embodiment of the present invention.

DETAILED DESCRIPTION OF THE PREFERRED EMBODIMENTS

A sheet-feeding mechanism according to one embodiment of the present invention will now be described, with reference to the accompanying drawings.

Figure 1:
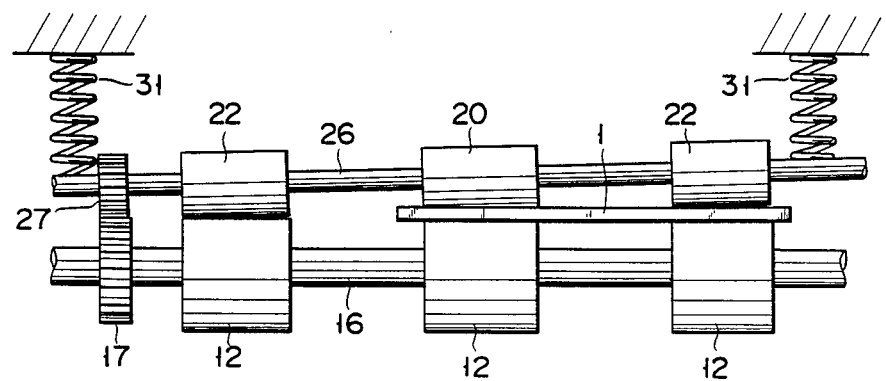
FIG. 1 is a front view of the entire sheet-feeding mechanism according to the first embodiment of the present invention.
Figure 2A:
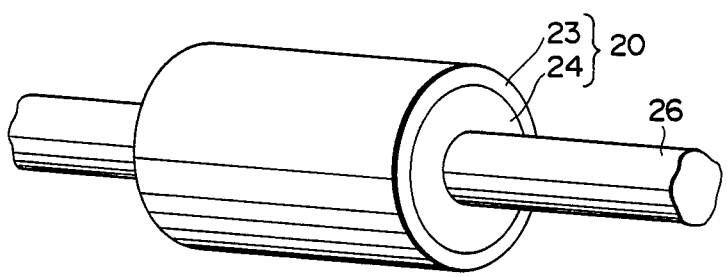
FIG. 2A illustrates the construction of a roller employed in the first embodiment.

As is shown in FIG. 1, the sheet-feeding mechanism of the embodiment comprises: first driving shaft 16; feed rollers 12 attached to first driving shaft 16 while being spaced from each other by a predetermined distance; second driving shaft 26; bail rollers (one of which is denoted by reference numeral 20, and the remaining ones are denoted by reference numeral 22) attached to second driving shaft 26 such that bail rollers correspond in position to feed rollers 12; gears 17 and 27 for driving the rollers (a driving source of the gears being not shown); and a pair of springs 31 connected to the respective ends of second driving shaft 26, so as to press the bail rollers against the feed rollers. To feed a sheet, the feed rollers and the bail rollers are rotated. The feed rollers are formed of rubber having a large coefficient of friction. To prevent being stained with ink and to prevent driving shaft 26 from slanting, bail rollers 22 located at the ends of second driving shaft 26 are formed of synthetic resin which has a small friction coefficient and which is hard to elastically deform, and bail roller 20 located in the center has a double structure made up of outer layer 23 and inner core 24, as is shown in FIG. 2A.

Like bail rollers 22 located at the ends, outer layer 23 of central bail roller 20 is formed of a material which has a small friction coefficient and is hard to elastically deform, to thereby prevent outer layer 23 from being stained with ink. More specifically, outer layer 23 is formed of engineering plastics, such as polyacetal, nylon, ABS, or the like. The friction coefficient of outer layer 23 should be determined in relation to the friction coefficient of the feed rollers, so that it is not limited to any specific value in the present invention. In practice, however, it is preferable that outer layer 23 be formed of polyacetal, which is surface active, has a small friction coefficient, and is hardly stained with ink. Where outer layer 23 is formed of polyacetal, its friction coefficient is approximately in the range of 0.3 to 0.5. Bail rollers 22 located at the ends also have a friction coefficient of this range, so as to permit a sheet to be fed in a stable manner.

If sheet 1 to be fed is thick, it may happen that second driving shaft 26 will slant. Even in such a case, outer layer 23 of central bail roller 20 should be in uniform contact with sheet 1; in other words, it should not contact sheet 1 at its part alone. Therefore, inner core 24 is formed of a material which is elastically deformable in the direction in which the bail rollers are pressed by springs 31. More specifically, inner core 24 is formed of urethane foam, soft rubber, or the like. In practice, it is preferably formed of urethane foam, which is not permanently deformed and has a small elastic modulus. Where inner core 24 is formed of urethane foam, its compression set is approximately in the range of 1.7% to 4.4%.

As may be understood from the above, it is most desirable that outer layer 23 and inner core 24 of the embodiment be formed of polyacetal and urethane foam, respectively. The ratio of the thickness of inner core 24 to that of outer layer 23 is not limited to any specific value, as long as outer layer 23 can be formed on inner core 24.

Inner core 24 is formed such that it has a completely circular cross section when second driving shaft 26 is horizontal. The outermost portion of inner core 24 is firmly bonded to the inner surface of outer layer 23, while the innermost portion thereof is firmly bonded to the outer surface of second driving shaft 26. Therefore, even when inner core 24 is elastically deformed, torque is reliably transmitted from second driving shaft 26 to outer layer 23.

Next, a description will be given of an operation of the embodiment mentioned above. First and second driving shafts 16 and 26 are driven by gears 17 and 27. The urging force with which the bail rollers are pressed against the feed rollers is produced by a pair of springs 31 (i.e., urging means) attached to the respective ends of second driving shaft 26. Bearings (not shown) for supporting the ends of second driving shaft 26 have an oval shape such that shaft 26 can be shifted in the vertical direction. Since second driving shaft 26 is pressed against first driving shaft 16, there is no gap between the feed rollers and the corresponding bail rollers. Therefore, a sheet is reliably brought into tight contact with the feed rollers and is fed with high accuracy.

If thick sheet 1 is fed, inner core 24 of bail roller 20 is elastically deformed, so that second driving shaft 26 is prevented from curving or slanting with reference to first driving shaft 16. Therefore, the bail rollers located at the ends of second driving shaft 26 do not separate from their corresponding feed rollers. It should be also noted that inner core 24 can transmit torque from second driving shaft 26 to outer layer 23 even when it is elastically deformed. Therefore, stable sheet feeding is enabled. If second driving shaft 26 is also deformable, the bail rollers and the feed rollers are brought into tight contact with each other, so that more stable sheet feeding is enabled.

Figure 2B:
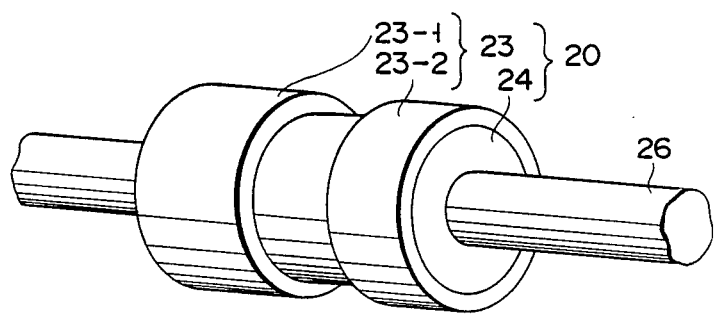
FIG. 2B illustrates the construction of a roller according to the second embodiment.
Figure 3A:
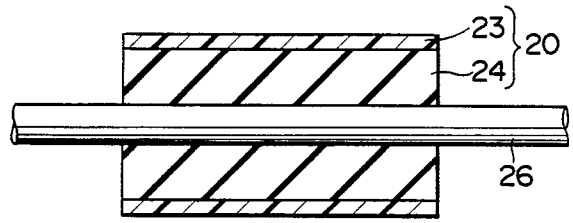
FIG. 3A is a sectional view of the roller shown in FIG. 2A.
Figure 3B:
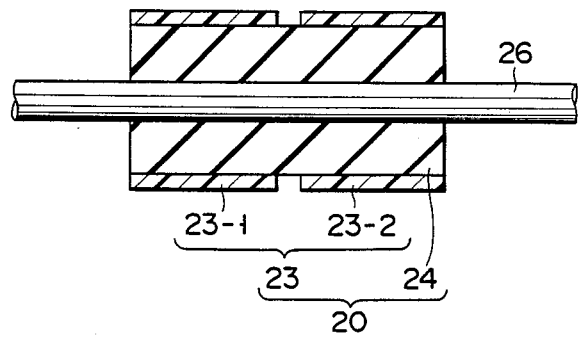
FIG. 3B is a sectional view of the roller shown in FIG. 2B.

FIG. 2B shows the construction of a roller according to the second embodiment. As is shown in FIG. 2B, double-structure bail roller 20 is axially longer than the bail roller shown in FIG. 2A. and its outer layer 23 is divided into a plurality of outer layer elements e.g., two outer layer elements 23-1 and 23-2. With this construction, sheet 1 can be reliably clamped between the rollers in spite of the elastically deformable limit of inner core 24.

Figure 4:
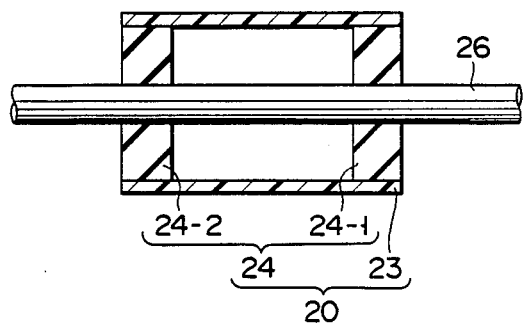
FIG. 4 illustrates the construction of a roller according to the third embodiment.

FIG. 4 illustrates the construction of a bail roller according to the third embodiment. The bail roller of this embodiment differs from the above-described bail rollers, in that it is hollow. More specifically, inner core 24 of the bail roller of the third embodiment is made up of a pair of discoid inner core elements 24-1 and 24-2, and these inner core elements are arranged such that a hollow region is defined therebetween. With this construction, inner core 24 is elastically deformable in the direction in which the bail rollers are pressed by springs 31 and can transmit torque from second driving shaft 26 to outer layer 23, as in the foregoing bail rollers.

Figure 5:
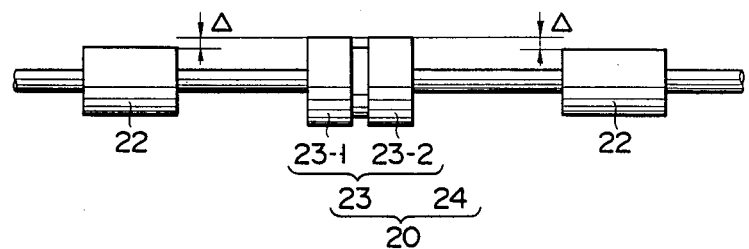
FIG. 5 illustrates the construction of a roller according to the fourth embodiment.

FIG. 5 illustrates the construction of a bail roller according to the fourth embodiment. This bail roller differs from the bail roller shown in FIG. 2B, in that it has a diameter which is 2Δ larger than those of the bail rollers located at the ends. More specifically, inner core 24 of the bail roller shown in FIG. 5 is increased in diameter, so as to improve the pressing effect of the bail roller. Accordingly, sheet 1 reliably comes into tight contact with the bail roller when it is fed.

Figure 6:
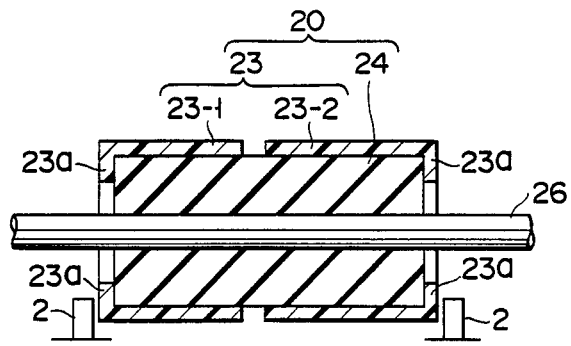
FIG. 6 illustrates the construction of a roller according to the fifth embodiment.

FIG. 6 illustrates the construction of a bail roller according to the fifth embodiment. The bail roller of this embodiment differs from the bail roller shown in FIG. 2B, in that flanges 23a in contact with inner core 24 are provided for outer layer elements 23-1 and 23-2. Flanges 23a prevent inner core 24 and outer layer elements 23-1 and 23-2 from being shifted with reference to each other.

In the fifth embodiment, projection 2 is formed on a stationary member (not shown), such as a frame. This projection prevents flanges 23a from being axially shifted with reference to second driving shaft 26. With this construction, the fifth embodiment produces the same advantages as those of the foregoing embodiments. It should be also noted that inner core 24 can be easily bonded to both outer layer 23 (23-1 and 23-2) and second driving shaft 26 (the use of a double-sided adhesive tape is sufficient). Moreover, the central bail roller is prevented from being shifted with reference to second driving shaft 26, and outer layer 23 and inner core 24 are prevented from being shifted from each other. Accordingly, inner core 24 is deformable reliably and stably.

Figure 7:
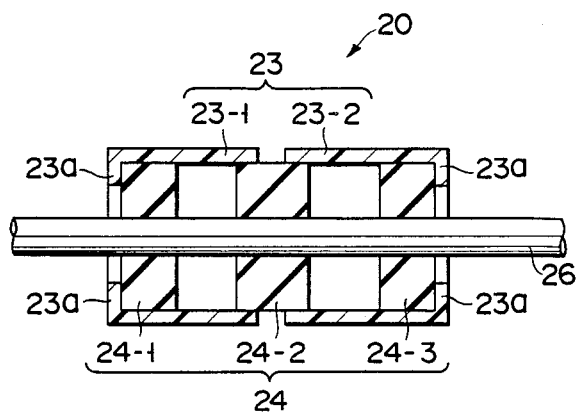
FIG. 7 illustrates the construction of a roller according to the sixth embodiment.

In the fifth embodiment, inner core 24 is formed by a single piece. However, it may be divided into a plurality of inner core elements 24-1, 24-2 and 24-3, as is shown in FIG. 7.

The foregoing embodiments were described, referring to the case where the number of feed rollers is three and the number of bail rollers is three. This, however, in no way limits the present invention. To attain the object of the present invention, it is only required that bail rollers 22 located at the ends be not elastically deformable and that a bail roller or rollers located between them be, all or partly, constructed in the manner mentioned above. For example, the number of feed rollers and that of bail rollers may be five, and the three bail rollers located between the end bail rollers may be of the double structure and elastically deformable, as is shown in FIG. 8. With the construction shown in FIG. 8, a sheet can be fed very accurately.

Moreover, a single feed roller axially extending along the first driving shaft may be provided, in place of the feed rollers mentioned above.

What is claimed is:

1. A sheet-feeding mechanism comprising:
   a first driving shaft;
   at least three feed rollers attached to the first driving shaft and spaced from each other by a predetermined distance, two of the feed rollers being end feed rollers located at both ends of the first driving shaft and the remaining said feed rollers being located between said end feed rollers;
   a second driving shaft;
   a pair of end bail rollers attached to the second driving shaft and located in correspondence to the end feed rollers;
   urging means for urging the end feed rollers against the corresponding bail rollers; and
   at least one double-structure bail roller attached to the second driving shaft in correspondence to one of said remaining feed rollers, said double-structure bail roller including an inner core and an outer layer having a small friction coefficient relative to said end bail rollers, said inner core being capable of transmitting torque from the second driving shaft to the outer layer and being elastically deformable in a direction in which the end feed rollers are pressed against the corresponding bail rollers 2. A sheet-feeding mechanism according to claim 1, wherein said outer layer of the double-structure bail roller includes a plurality of outer layer elements divided in an axial direction of the second driving shaft.

3. A sheet-feeding mechanism according to claim 2, wherein each of said outer layer elements has a flange at an end thereof, said flange being in contact with the inner core.

4. A sheet-feeding mechanism according to claim 1, wherein said double-structure bail roller has an outer diameter larger than those of the end bail rollers.

* * * * *